United States Patent [19]

Greene et al.

[11] Patent Number: 4,620,844
[45] Date of Patent: Nov. 4, 1986

[54] TENTER CHAIN

[75] Inventors: Charles W. Greene, Spartanburg; Christopher E. Hosmer, Taylors, both of S.C.

[73] Assignee: Marshall and Williams Company, Greenville, S.C.

[21] Appl. No.: 726,481

[22] Filed: Apr. 24, 1985

[51] Int. Cl.[4] .............................................. F16H 57/04
[52] U.S. Cl. ........................................ 474/91; 474/209
[58] Field of Search ...................... 474/91, 209, 206; 141/349; 4/220, 222; 26/89

[56] References Cited

U.S. PATENT DOCUMENTS 1,828,934 10/1931 Kramer .......................... 141/349 X
1,850,456  3/1932 Hoey ................................... 26/89
3,521,999  7/1970 Gauck ............................. 4/222 X Primary Examiner—James A. Leppink
Assistant Examiner—Frank McKenzie
Attorney, Agent, or Firm—Bailey & Hardaway

[57] ABSTRACT

A tenter chain has been provided wherein a lubricating apparatus includes means for preventing the accumulation of old grease with the introduction of same on a subsequent lubricating operation as a result of the insertion of the elongated nozzle of a grease dispensing gun into a passageway leading to a grease receiving reservoir.

2 Claims, 5 Drawing Figures

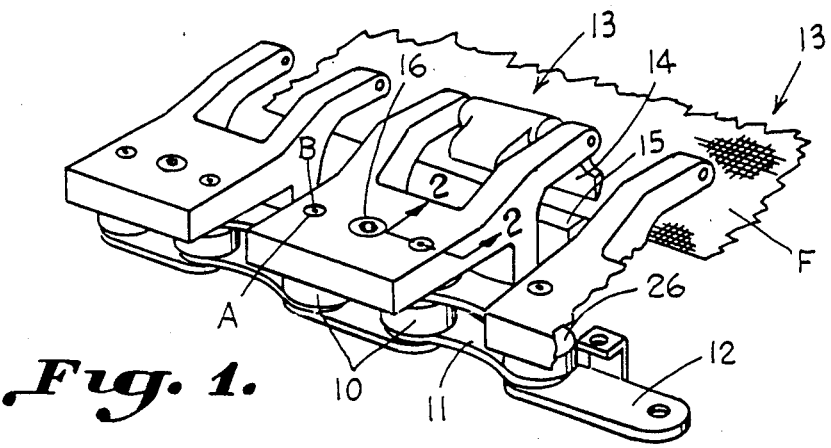
Fig. 1.
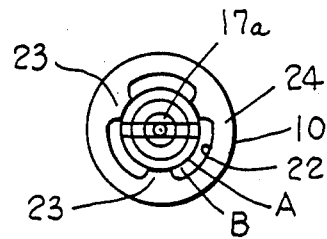
Fig. 5.
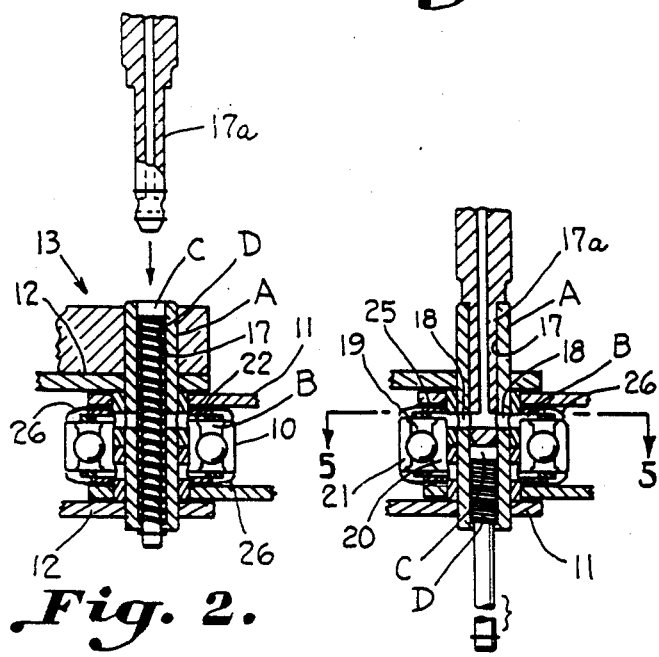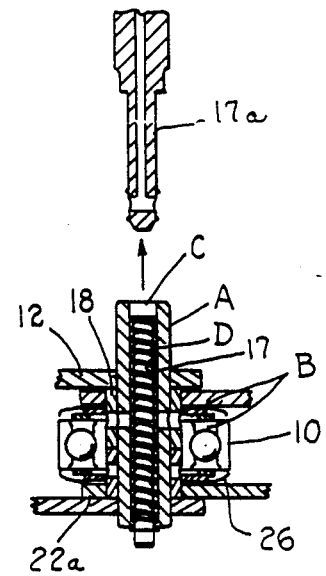
Fig. 2.  Fig. 3.  Fig. 4.

4,620,844

TENTER CHAIN

BACKGROUND OF THE INVENTION

Tenter chains have long been provided with ball bearings and the like having a reservoir for receiving grease dispensed by the elongated nozzle of a grease dispensing gun through an elongated passageway in a pin. It has been found that grease collects in the passageway upon removal of the nozzle and such grease degrades and becomes contaminated as a result of the heated atmosphere to which a tenter clip is subjected as in a textile fabric finishing range. Although the grease is of a type which is designed for prolonged use even when subjected to elevated temperatures, it has been found that when subjected to temperatures between 300° to 450° Fahrenheit which are maintained in the cloth finishing ranges, that such old grease deteriorates such as to be undesirably introduced into the bearings upon subsequent lubrication. Since fairly large amounts of grease are used in connection with tenter frames and such lubrication is of a very expensive variety, it is desirable to avoid the introduction of old grease into the tenter frame lubricating reservoir during lubricating operation thus fowling the new grease.

Accordingly, it is an important object of this invention to avoid the introduction of old grease into the reservoir of a tenter chain bearing during lubricating operations.

Another important object of the invention is to provide grease receiving reservoirs through the use of washers designed to provide an effective seal and at the same time assure an open passageway to the grease receiving reservoir.

SUMMARY OF THE INVENTION

It has been found that simplified structure may be provided for avoiding the introduction of old grease into tenter frame bearings reservoirs during lubrication through the provision of a piston and compression spring, therefor, such that the piston removes by wiping away excess grease from the elongated passageway, carried in the pin, which maintains the chain components and mountings for the tenter clips during lubrication. The grease receiving reservoirs adjacent the bearings above and below are sealed through the use of washers one of which has projections for supporting the other while assuring the passageway of grease to the reservoir.

The U.S. Pat. No. 1,850,456 shows a tenter chain having a grease reservoir having a spring biased cap to prevent contamination. U.S. Pat. Nos. 1,828,934 and 3,521,999 illustrate the use of spring piston arrangements to prevent the escape of lubricant.

BRIEF DESCRIPTION OF THE DRAWING

The construction designed to carry out the invention will be hereinafter described, together with other features thereof.

The invention will be more readily understood from a reading of the following specification and by reference to the accompanying drawing forming a part thereof, wherein an example of the invention is shown and wherein:

FIG. 1 is a perspective view illustrating a tenter chain having clips equipped within the structure for preventing grease contamination constructed in accordance with the present invention, FIG. 2 is a sectional elevation taken on the line 2—2 in FIG. 1 preparatory to the elongated nozzle of a grease dispensing gun being inserted into the passageway containing the piston and spring for biasing spring upward, FIG. 3 illustrates the piston in freely dispressed position, FIG. 4 illustrates the parts after removal of the grease dispensing nozzle, and FIG. 5 is a sectional plane view taken on the line 5—5 in FIG. 3.

DESCRIPTION OF A PREFERRED EMBODIMENT

A tenter chain is illustrated having spaced horizontal bearings carrying a tenter clip therebetween wherein a lubricating apparatus is provided for receiving grease from an elongated nozzle of a grease dispensing gun. A vertical pin A extends into each of the bearings carrying chain links and fastening means for the tenter clips. The bearings have a grease receiving reservoir B above and below bearings carried between inner and outer races. The vertical pins have a vertical passageway and opposed grease dispensing openings communicating with a grease receiving reservoir. A piston C is received within the vertical passageways. A compression spring D is carried within the vertical passageways beneath the pistons. The pistons are depressible in the passageway by said nozzle beneath a grease receiving reservoir for opening the grease receiving reservoir for reception of grease in a grease receiving reservoir. Thus, the piston is urged upwardly in the passageway by the spring following introduction of grease into a reservoir from said passageway avoiding contamination preparatory to the next greasing operation.

The tenter chain includes roller members 10 having the bearing arrangements described above. The bearings are connected by inner links 11 and outer links 12. The chain supports the tenter clips broadly designated at 13 having upper movable jaws 14 and fixed lower jaws 15. The tenter clips are connected by suitable fastening means 16 including a threaded bolt for fixing and connecting the tenter clip to the chain. The tenter clips 13 in FIG. 1 are illustrated as securing the selvage portion of a web in the form of fabric or a cloth F for treatment in a tenter. Such treatment may assume a variety of forms including drying, curing and dyeing but all such operations are carried out in a range at elevated temperatures.

FIG. 2 illustrates the placement of the pin A which has a vertical passageway 17 for carrying grease to the reservoir B from the elongated nozzle 17a of a grease dispensing gun. The pins also carry out the function of securing the links 11 and 12 and also function to position the tenter clips 13 upon the chain. The pin also has opposed passageways 18 carried therein for delivering grease to the reservoirs. The reservoirs include the portion 19 between and above the inner and outer races 20 and 21, respectively. The reservoirs further include passageways 22 which are defined between projections 23 carried by the inner of a pair of washers receiving grease from openings in the sleeves 22a. The washer having the projections 23 also has an outer rim 24 which acts as a seal for the reservoir while the inwardly projecting members 23 support a sealing ring 25 in the form of a washer for further defining a reservoir. The washers and the bearing are covered by the usual bearing seals 26.

It is thus seen that a tenter chain has been provided having simplified lubricating structure which prevents the introduction of old grease into the tenter chain bearings during a lubricating operation.

While a preferred embodiment of the invention has been described using specific terms, such description is for illustrative purposes only, and it is to be understood that changes and variations may be made without departing from the spirit or scope of the following claims.

What is claimed is:

1. For use in a tenter chain having spaced horizontal bearings carrying a tenter clip therebetween, a lubricating apparatus for receiving grease from an elongated nozzle of a grease dispensing gun comprising:

a vertical pin extending into each of said bearings carrying chain links and fastening means for said tenter clips;

said bearings having a grease receiving reservoir above and below ball bearings between inner and outer races;

said vertical pins having a vertical passageway and opposed greased dispensing openings communicating with a grease receiving reservoir;

a piston received within said vertical passageways;

a compression spring within said vertical passageways beneath said pistons; and said piston being depressible in said passageway by said nozzle beneath a grease receiving reservoir and opening said grease receiving reservoir for reception of grease in a grease receiving reservoir;

whereby said piston is urged upwardly in said passageway by said spring following introduction of grease into a reservoir from said passageway avoiding contamination preparatory to the next greasing operation.

2. The structure set forth in claim 1 including, a pair of washers defining said grease receiving reservoirs, one of said washers carrying inwardly extending projections supporting the other of said washers and being spaced such as to ensure an open passageway to said reservoir for reception of grease from said elongated nozzle.

* * * * *